US007746558B2

(12) United States Patent
Kaule

(10) Patent No.: US 7,746,558 B2
(45) Date of Patent: Jun. 29, 2010

(54) METHOD FOR PRODUCING GRATING IMAGES

(75) Inventor: Wittich Kaule, Emmering (DE)

(73) Assignee: Giesecke & Devrient GmbH, Munich (DE)

( * ) Notice: Subject to any disclaimer, the term of this patent is extended or adjusted under 35 U.S.C. 154(b) by 1239 days.

(21) Appl. No.: 10/517,483

(22) PCT Filed: Jun. 10, 2003

(86) PCT No.: PCT/EP03/06082

§ 371 (c)(1),
(2), (4) Date: Dec. 10, 2004

(87) PCT Pub. No.: WO03/107047

PCT Pub. Date: Dec. 24, 2003

(65) Prior Publication Data

US 2005/0185280 A1 Aug. 25, 2005

(30) Foreign Application Priority Data

Jun. 12, 2002 (DE) ................................ 102 26 112
Sep. 18, 2002 (DE) ................................ 102 43 413

(51) Int. Cl.
*G02B 5/18* (2006.01)

(52) U.S. Cl. ........................ 359/566; 359/573; 359/900

(58) Field of Classification Search ....................... None
See application file for complete search history.

(56) References Cited

U.S. PATENT DOCUMENTS 5,101,297 A * 3/1992 Yoshida et al. .............. 359/566
5,335,113 A * 8/1994 Jackson et al. .............. 359/569
2002/0041323 A1* 4/2002 Hayashi et al. ............. 347/224

FOREIGN PATENT DOCUMENTS

JP 09230122 A * 9/1997
WO WO 9103747 A1 * 3/1991

OTHER PUBLICATIONS

Rai-Choudhury XP- 002251881, SPIE Handbook for Microlithography, Micromaching and Microfabrication, vol. 1: Microlithography (pp. 1-16, 2-fold).

* cited by examiner

*Primary Examiner*—Arnel C Lavarias
(74) *Attorney, Agent, or Firm*—Rothwell, Figg, Ernst & Manbeck, P.C.

(57) ABSTRACT

A method for producing a grating image, which has at least one grating field recognizable with the naked eye, in which are disposed grating elements, which are produced by a writing apparatus. In a first procedure step at least one grating element is determined, which completely lies within one working field. Then a sequence of working fields is defined, in which the grating elements are to be produced by the writing apparatus. Finally, the working fields are moved to by a relative movement of a carrier, on which is located a substrate to be inscribed, and the writing apparatus, and the grating elements are written into the substrate with the writing apparatus within the respective working fields.

51 Claims, 11 Drawing Sheets

METHOD FOR PRODUCING GRATING IMAGES

CROSS-REFERENCE TO RELATED APPLICATION

This application is a National Phase of International Application Serial No. PCT/EP03/06082, filed Jun. 10, 2003.

FIELD OF THE INVENTION

The invention relates to a method for producing a grating image by means of a writing apparatus, which has at least one grating field recognizable with the naked eye, in which are disposed grating elements. The invention further relates to an apparatus for preparing and carrying out this method as well as a grating image and a security document with such a grating image.

BACKGROUND OF THE INVENTION

Optically variable elements, such as holograms or diffraction grating images, due to their optical properties varying with the viewing angle are frequently used as protection from forgery or copy for documents of value, such as credit cards, bank notes or the like, but also for product securing on any product packagings. For the mass production of such security elements, usually, so-called "master structures" are produced, which have the respective phase information about the optically variable element in the form of a spatial relief structure. This, typically, is a glass substrate with a photoresist coating, in which the diffraction structure is preserved in the form of peaks and valleys. Starting out from this master structure, by duplicating and molding the relief structure embossing tools of any desired form are produced, with the help of which the diffraction structures reproduced by the relief structure can be transferred in large quantities to suitable substrates.

The master structure can represent the complete diffraction structure of a real hologram, or of a grating image composed of different diffraction gratings. The diffraction gratings differ from each other regarding the grating constant and/or the azimuth angle and/or the profile structure of the grating lines as well as the contour or the outline of the image area covered with the respective diffraction grating.

The grating constant corresponds to the distance between the grating lines and is of essential importance for the colour of the image area in the grating image recognizable when viewed from a certain viewing angle. The azimuth angle describes the inclination of the grating lines concerning a reference direction and is responsible for the visibility of these image fields viewed from certain viewing directions. The line profile generally is responsible for the intensity and plays a particular role in grating images of zero order. On the basis of this technique, therefore, optically variable images, e.g. moving images or also plastically appearing images, can be produced.

The individual diffraction gratings can be produced either holographically or by means of electron beam lithography. When holographically recording the diffraction gratings, in an appropriate substrate light beams consisting of spatially expanding, uniform wave fields are overlapped. For this purpose, usually, laser radiation is used. With electron beam lithography the diffracting grating lines are exposed directly to an appropriate substrate, the exposure operation frequently also being referred to as writing operation. For this method in general a glass plate is used as a substrate, which is coated with a layer sensitive to the respective particle radiation or light radiation ("photoresist"). When exposing, substrate and electron beam can be moved relative to each other. Here it is possible, to hold the substrate motionless and to electromagnetically deflect the electron beam. The deflection range of the electron beam lies within a range of a few tenths of a millimeter. In case of large-scale deflections, so-called "lens errors" of electron optics will disturb, that are noticeable also in the finished diffraction grating. Alternatively, the substrate can be moved by means of an x-y-table, while the electron beam is held motionless. For this purpose, however, a high-precision guiding of the table is required.

As to be able to produce grating images of the above-mentioned kind with the help of the electron beam lithography, the entire grating image is divided into a multitude of small fields of an edge length of up to some tenths of a millimeter. I.e. the grating image independent of the depicted motif is divided into individual "screen elements", which by means of the electron beam are inscribed with grating lines. Here the grating lines are written into the individual small fields via the deflection of the electron beam, while the movement from field to field is effected by shifting the table. In this way large surfaces can be inscribed. This kind of electron beam exposure in general is referred to as "stitching mode". This proceeding, however, has the disadvantage, that the image is composed of many pieces of small surfaces, which upon closer viewing are visually recognizable, coarsen the image, and lead to colour errors. In the case of larger image surfaces, such as e.g. lines, which when viewed from one viewing angle are to show a uniform colour, the surface is not provided with an appropriate, uniform diffraction grating. Instead this diffraction grating is made up of many small elements. Due to the tolerances when putting together the small surface elements, the grating lines extending across the image surface have kinks or gaps, which leads to visible errors.

In the "CPC mode" (Continuous Path Control, product of the company Leica Microsystems Ltd.), however, the electron beam is mounted stationary, while the table is moved according to the structures to be exposed. But this mode is less suitable for the production of finely structured grating images, such as for example guilloche images, or images or microwriting divided into fine lines, because these finely structured images have a predominant number of short grating lines. For that reason for each grating image a number of stop and start operations of the table has to be effected which reaches the millions. This represents a load for the table mechanism and consumes very much time.

SUMMARY OF THE INVENTION

The invention therefore is based on the problem of creating a method which enables the production of finely structured grating images with the help of electron beam lithography, and which thereby avoids the aforementioned disadvantages.

The problem is solved by the features disclosed herein.

The invention is based on the finding, that as to avoid optical errors in grating images, the grating elements producing the optically variable effect and preferably designed as grating lines, have to be produced continuously in one procedure step. Therefore, according to the inventive method only those grating lines are exposed according to this mode, which along their entire length lie within the reach of the electromagnetic deflection of the electron beam. As to be able to compose grating images in this way, working fields are defined, towards which the table can be moved. Within the individual working fields the grating lines are exposed along their entire length by deflecting the electron beam into an appropriate substrate.

According to the inventive method in a first step those grating elements are determined, the starting points and end points of which (and optionally intermediate points as well) are lying within the motion area of the writing apparatus. Then the working fields are defined, in which the writing apparatus is moved relative to a carrier, on which a substrate to be inscribed is located. Finally, the motion path of the carrier is defined, so as to be able to move the carrier towards the working fields one after the other and produce the grating elements lying in the respective working field.

The determination of the grating elements preferably is effected with the help of a data record, which contains information about starting points and end points and optionally also intermediate points of the grating elements forming the grating field, in the form of position coordinates.

Within the framework of this invention, grating image preferably means an image motif recognizable with the naked eye or an alphanumeric information with diffractive or reflecting effects. Alphanumeric information also includes a microwriting. The grating image has at least one grating field recognizable with the naked eye, which can be of any outline contour, in which a grating pattern consisting of grating elements of any form is disposed. Preferably, these grating elements consist of grating lines, which can be straight, curved or of any other design.

The diffractive grating images preferably are composed of different diffraction gratings. With the inventive method any complicated diffraction structures up to computer-generated holograms can be produced.

The inventive method preferably is suitable for producing finely structured grating images or grating images, which have grating fields, the length and/or width of which lies within a range of 5 μm to 500 μm and preferably amounts to 20 μm to 100 μm.

The grating fields in the case of diffractive grating images are provided with grating elements, preferably grating lines, with a grating constant of about 0.1 to 10 μm, preferably 0.5 to 2 μm.

As a writing apparatus the inventive method preferably uses a particle beam, in particular an electron beam, because therewith resolutions up to the nanometer range are possible. If grating images are to be produced, which do not require such a high resolution, for example grating images which are based only on reflecting effects, also other lithography instruments are possible so as to produce the grating elements in an appropriate substrate. This can be, for example, a focussing UV laser or a precision milling apparatus. For the milling operation preferably metal plates are used as a substrate. The term "photoresist" within the framework of this invention comprises any substrate, into which information in the form of a relief structure can be incorporated.

The inventive principle of dividing the writing operation into a high-precision only-transport operation and a high-precision moving and writing operation, which is optimized regarding the writing apparatus used, here again can be advantageously applied.

According to a first embodiment, for example, the working fields can be moved to via a table, which is adapted to be controlled via a high-precision mechanism, such as a high-precision spindle. With this technique longer distances can be covered relatively fast and very precise. For the actual writing operation on the table can be disposed a further smaller table, which is moved, for example, in a piezoelectric fashion. Alternatively, the small table can be moved by other means, e.g. via magnetostriction. In such a way short distances in the micrometer range can be covered in a fast and exact fashion. I.e., during the writing operation the substrate to be inscribed is moved relatively to the stationary writing apparatus by means of the piezoelectric table, until all elements of the entire motif, accessible with the piezoelectric table, are written. Then both the substrate and the piezoelectric table with the help of the mechanically movable table are transported to the next working field, in the area of which the substrate again is inscribed. This proceeding is suitable preferably for milling apparatuses, but can be used with all other mentioned writing apparatuses. In case an electron beam is used, alternatively it is expedient, as already mentioned above, to move to the working fields via a movement of the table, while the grating elements lying in the working field are produced by electromagnetic deflection of the electron beam.

For illustrating the inventive method one starts out from a grating image, which consists of merely one straight, linear grating field with a width of the above-mentioned range between 0.02 and 0.2 millimeter. The line can have any length. The grating elements of the linear grating field are straight grating lines, which extend across the width of the grating field and thus have a length, which corresponds to the width of the grating field. This grating image is to be exposed to a suitable photoresist with the help of an electron beam. The photoresist is located on a substrate, preferably a glass plate, which is disposed on an x-y-table mounted to be movable.

For producing this grating image a data record is provided, which contains information about the starting points and end points of the grating lines. This data record, for example, can date from the draft phase of the grating image, in particular when the design of the grating image was created in a computer-aided fashion with the help of special programs. With the help of these data it is determined, which of the grating lines lie within the electromagnetic deflection area of the electron beam. Since the starting points and end points of all grating lines lie in the area, which can be reached via an electromagnetic deflection of the electron beam, all grating lines can be written continuously without interruption along their entire length. Finally a motion path for the table is determined, on which the photoresist is located. Having determined all necessary data required for the control of the individual apparatuses, the first working field is moved to by moving the table. Within this working field the grating lines are produced by deflecting the electron beam. The individual grating lines are produced by continuously deflecting the electron beam and do not have any interruptions or undesired kinks. Having written all grating lines lying within the area of the first working field, the table is moved again and the next working field is brought in a position to be exposed. This operation is repeated as long as the entire linear grating field is exposed to the photoresist.

The inventive method has the advantage that the individual grating elements are uniform within themselves in as large as possible areas, and within these areas are not composed of several partial segments. Moreover, by dividing the grating field into working areas the number of time-intensive stop and start operations of the table are reduced to a minimum.

When the grating fields are to have complicated outline contours, such as e.g. guilloche lines, it can occur, that the grating elements have starting points and end points, which lie outside the deflection area of the writing apparatus. Such too large grating elements can either be produced by moving only the substrate while the writing apparatus remains stationary, or by dividing the grating elements into smaller pieces accessible for the writing apparatus, which are put together.

The inventive apparatus for carrying out the inventive method comprises a transport apparatus, with which the writing apparatus and the substrate can be moved relative to each other along a longer distance, a motion apparatus, with which the writing apparatus and the substrate can be moved relative to each other during the actual writing operation, as well as apparatuses for controlling the above-mentioned. The motion apparatus can be, for example, the already mentioned piezo-electric table or an apparatus for deflecting a particle beam or light beam. The motion apparatus enables a fast and precise relative of substrate and writing apparatus in the micrometer range.

In the event of an exposure by electron beam, the apparatus preferably has a table mounted to be movable and used only for the transport operation, as well as an electromagnetic apparatus for deflecting the electron beam during the writing operation. Additionally, the inventive apparatus can also contain a processing unit, in which the above-described motion sequences of the writing apparatus and the carrier are calculated.

As to have not to spend too much time with calculations during the writing operation, the preparation and the decision, how the grating image in detail is composed, or the calculation of the control data for the writing apparatus and the carrier preferably take place in a computer simulation before the actual writing operation. In this phase is decided, which grating elements lie within the deflection area of the writing apparatus, how the working fields have to be designed, which grating elements lie in which working field, how the carrier has to be moved so as to be able to move to all working fields in an economical fashion, whether, and if so, which grating elements are to be produced according to a different method.

The inventive method of course can also be used for grating images, which have both finely structured grating image parts and large-surface grating image parts. In this case while preparing the writing operation it is determined, which parts of the grating image are to be produced with the inventive method and which parts are to be produced according to a different method.

The writing paths within the working fields can be designed in different fashions. For example, the writing apparatus can be guided along a meandering or a zigzag path. In the event an electron beam or a laser is used, the meandering guidance has the advantage that the beam does not have to be turned off along the short connecting sections. In the case of a zigzag-shaped writing path the beam is turned off while returning, or the retreats are covered so fast, that a relevant exposure does not take place.

According to an alternative method variant in each working field only one line or one grating element is written. I.e., the writing apparatus produces one grating element at a time, which lies in its working area. At the same time or while retreating the carrier step-by-step or continuously is moved from grating element to grating element. The individual grating elements can be straight or bent in any fashion. In the simplest case the grating elements succeeding each other have an identical form. But when the writing apparatus is appropriately programmed any grating elements can be produced.

The substrate produced according to the inventive method after a possible developing step forms a master structure, which can be transferred to any embossing tool. So as to produce these embossing tools, for example, the relief structure of the grating image is rendered electrically conductive, e.g. by spraying on a metal layer, and then is galvanically molded into a nickel foil. Starting out from this nickel foil further nickel foils are molded, which, for example, are used for embossing a large number of copies into a thermoplastic plastic plate, e.g. acrylic glass. This plastic plate, too, is galvanically molded and the molded metal foil is used as an embossing mold for a multitude of copies of the original grating image. For this purpose the metal foil preferably is welded to form a cylindrical embossing mold and is mounted to a mounting cylinder.

With these embossing tools any layers, such as for example a thermoplastic layer or a lacquer layer, in particular a UV curable lacquer layer, can be embossed. The embossable layer is preferably located on a carrier material, such as a plastic foil. Depending on the intended use the plastic foil can have additional layers or security features. Thus the plastic foil can be used as a security thread or a security label. Alternatively, the plastic foil can be designed as a transfer material, such as for example in the form of a hot stamping foil, which serves for the transfer of individual security elements to the objects to be secured.

The grating images preferably are used for protecting documents of value, such as bank notes, ID cards, passports, and the like. Of course they can be also employed for other goods to be secured, such as CDs, books, bottles etc.

According to the invention it is not necessarily required to compose the entire grating image out of grating fields. In fact only parts of a whole image can be realized in the form of grating fields, in particular inventive grating fields, while other image parts are designed with the help of other methods, such as for example holographic gratings, real holograms or prints.

BRIEF DESCRIPTION OF THE DRAWINGS

Further advantages of the invention are explained with reference to the figures.

DETAILED DESCRIPTION OF THE INVENTION

Figure 1:
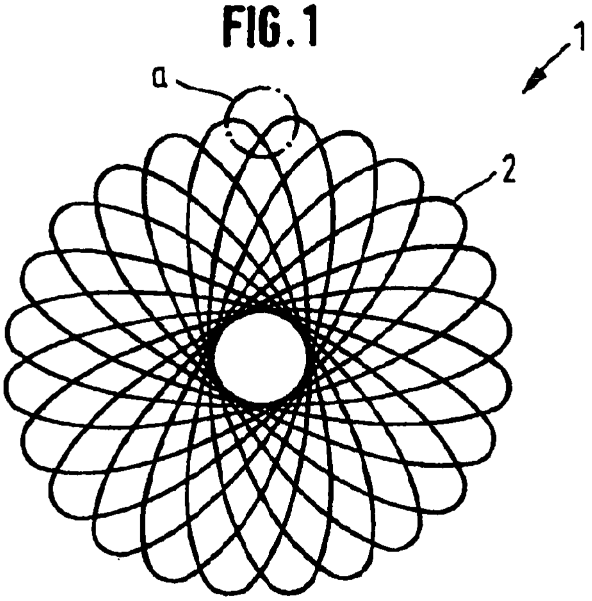
FIG. 1 shows a design, which according to the inventive method is realized in a grating image.

In FIG. 1 is shown an inventive grating image 1. The shown example is a finely structured grating image 1, which is composed of guilloche lines 2. In this guilloche image 1 the individual guilloche lines 2 are represented by different diffraction structures, in particular diffraction gratings. The diffraction gratings can differ from each other with respect to their grating constants and/or the azimuth angle, so that when viewed from a certain viewing angle only a part of the guilloche lines 2 can be recognized and the visible guilloche lines 2 show different colours. When changing the viewing angle other guilloche lines 2 become visible and the colours of the individual guilloche lines 2 change. The diffraction gratings can also be designed in such a way that all guilloche lines 2 are visible from all viewing angles and merely differ with respect to their colours. In this case, when changing the viewing angle only an interplay of colours occurs.

Figure 2:
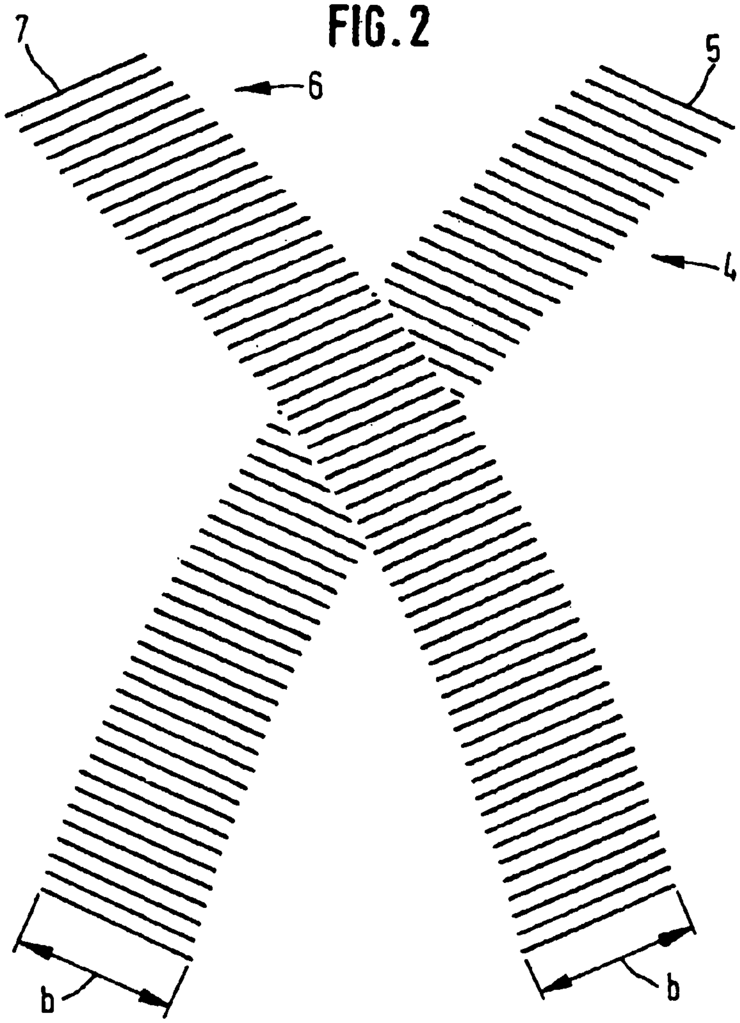
FIG. 2 shows a highly magnified detail of the inventive grating image according to FIG. 1, FIGS. 3*a*-3*c* show the production of a grating field according to the inventive method.

In FIG. 2 the detail a is shown highly magnified, so that the individual diffraction grating lines 5, 7 are visible. The shown guilloche lines here constitute the inventive grating fields 4, 6, in each of which are disposed grating elements 5, 7. As already mentioned above, the grating elements 5, 7 in the present example are formed straight and extend across the entire width b of the grating fields 4, 6. The form of the grating fields 4, 6 is determined by the picture motif 1 alone. Width and length of the grating fields 4, 6 are determined by the motif. In the present example of a guilloche line the width preferably lies within a range of 0.02 to 0.2 millimeter. The grating fields 4, 6 here are produced according to the inventive method. The inventive method is explained in the following with the help of the grating field 4.

Figure 3A:
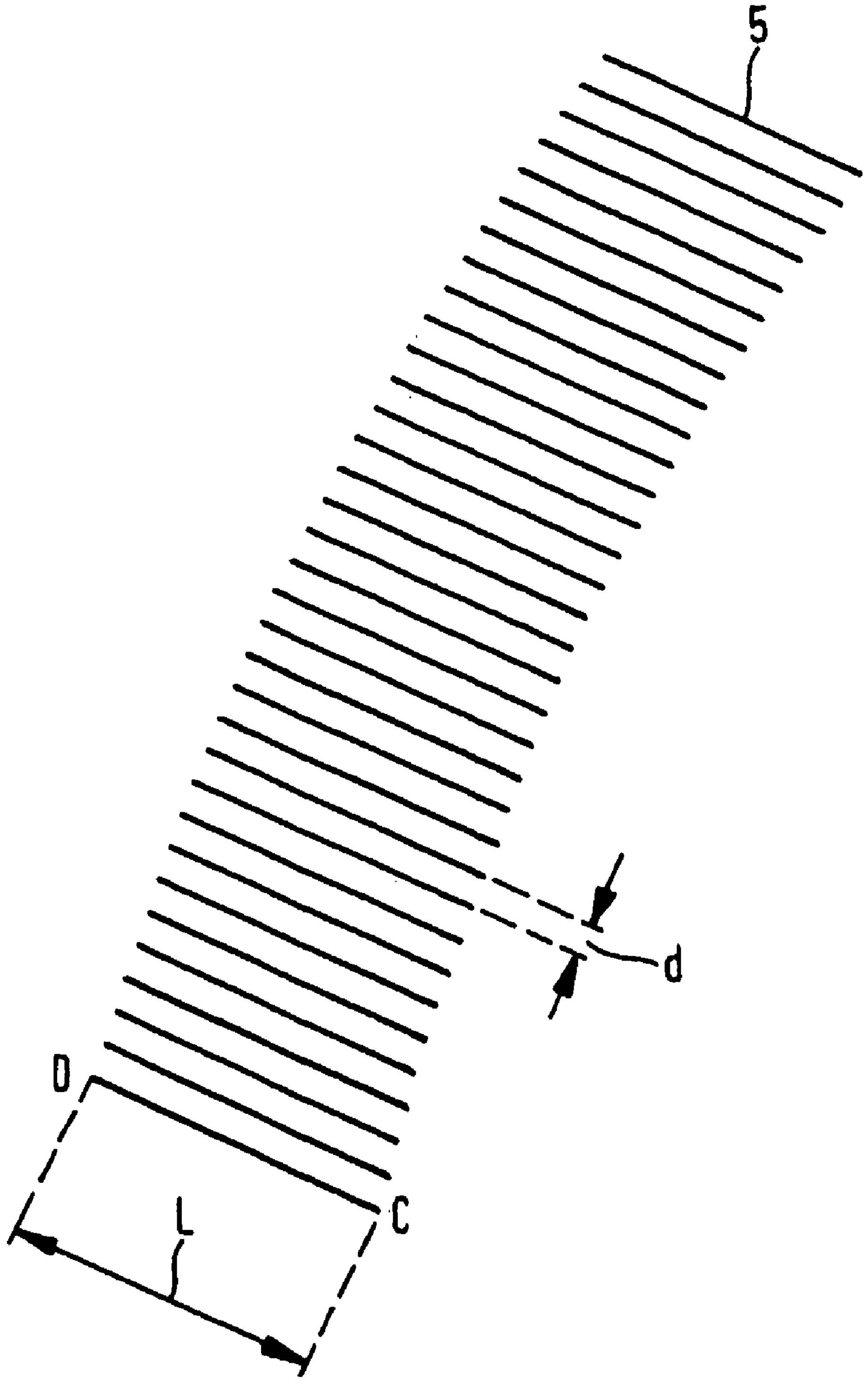

For the production of the grating field 4 in a first step a data record is provided, which contains information about the form and position of the grating elements 5, which preferably exist in the form of coordinates in a certain coordinate system. In case the grating lines are straight, the coordinates of the starting points and end points of the individual grating elements 5 will be sufficient. This is schematically outlined in FIG. 3*a*. Each of the grating lines 5 has a starting point C and an end point D, the coordinates of which are stored in a defined x-y-level in the data record. From the starting points and end points indirectly results the length L of each grating line 5 as well as the distance of the individual grating lines 5 to each other. In the shown example the distance d is constant for all grating lines 5 of the grating field 4. However, the distance can vary in any way, also along a grating line which is not disposed in parallel to the next grating line, or when the grating lines are designed, for example, wave-shaped.

If the grating lines are not straight, the data record will contain the coordinates of many intermediate points lying close to each other, which describe the form of the grating elements as a polygonal curve. Alternatively, the form of the grating elements can be described as a Bezier curve, in which the coordinates of merely a few intermediate points and additionally a tangential direction with respect to the further path of the curve are stored.

The coordinates of a grating element, therefore, can only consist of the coordinates of the starting point and end point of the grating element, or of the coordinates of a certain number of intermediate points and optionally can comprise information on direction.

Figure 3B:
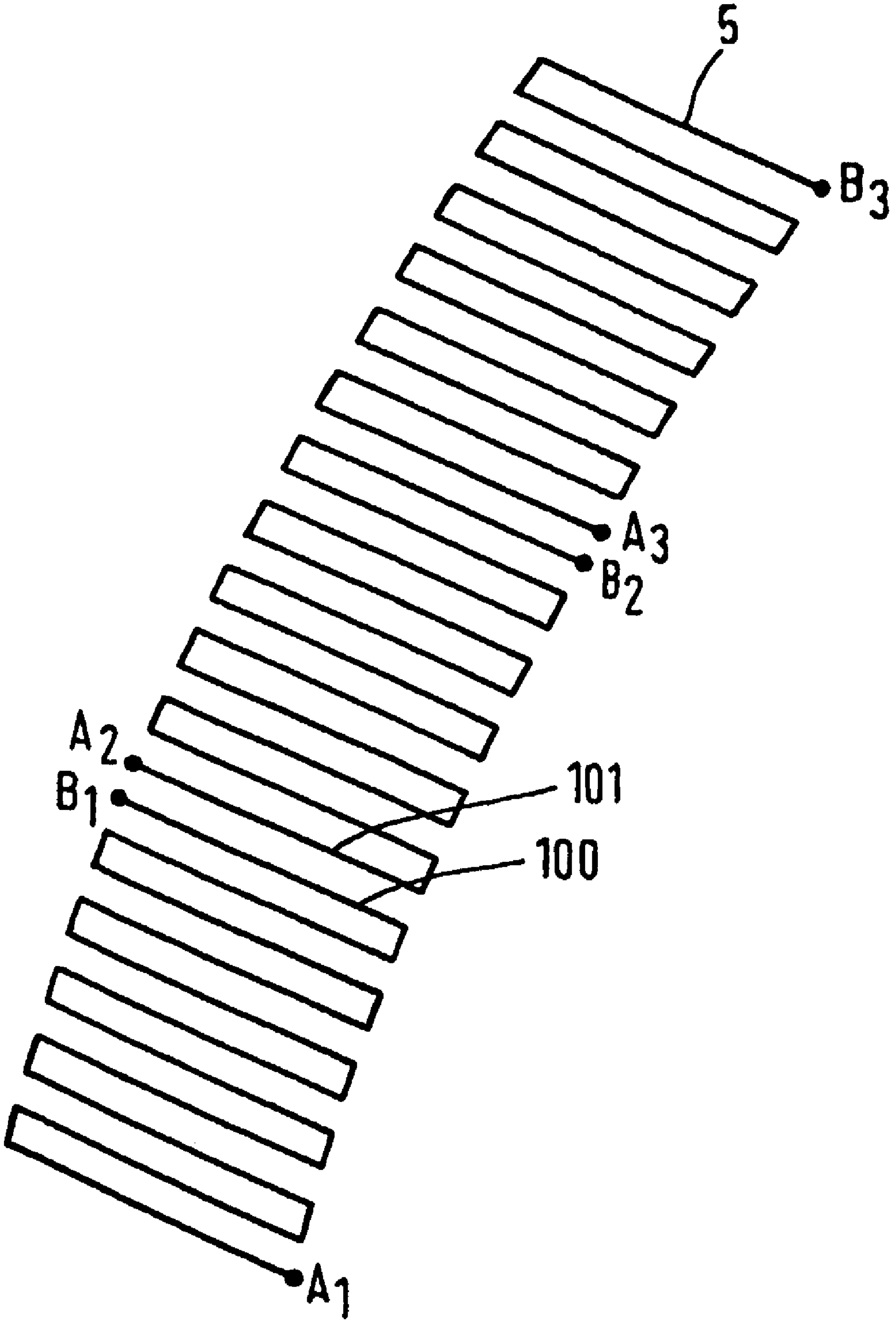

With the help of the coordinates of the individual grating elements 5 to be produced it is determined, which of the grating elements can be continuously written by deflection of an electron beam. A window of the size of the working field is defined. Starting out from a defined starting point this coordinate window is put over the coordinates of the grating elements and determines, which grating elements succeeding each other completely lie in the area of this coordinate window. The coordinates of the grating lines 5, which lie within a coordinate window, are now sorted and arranged in such a way, that polygonal curves $A_1B_1$, $A_2B_2$ and $A_3B_3$ are the result. This procedure step is shown in FIG. 3*b*.

Figure 3C:
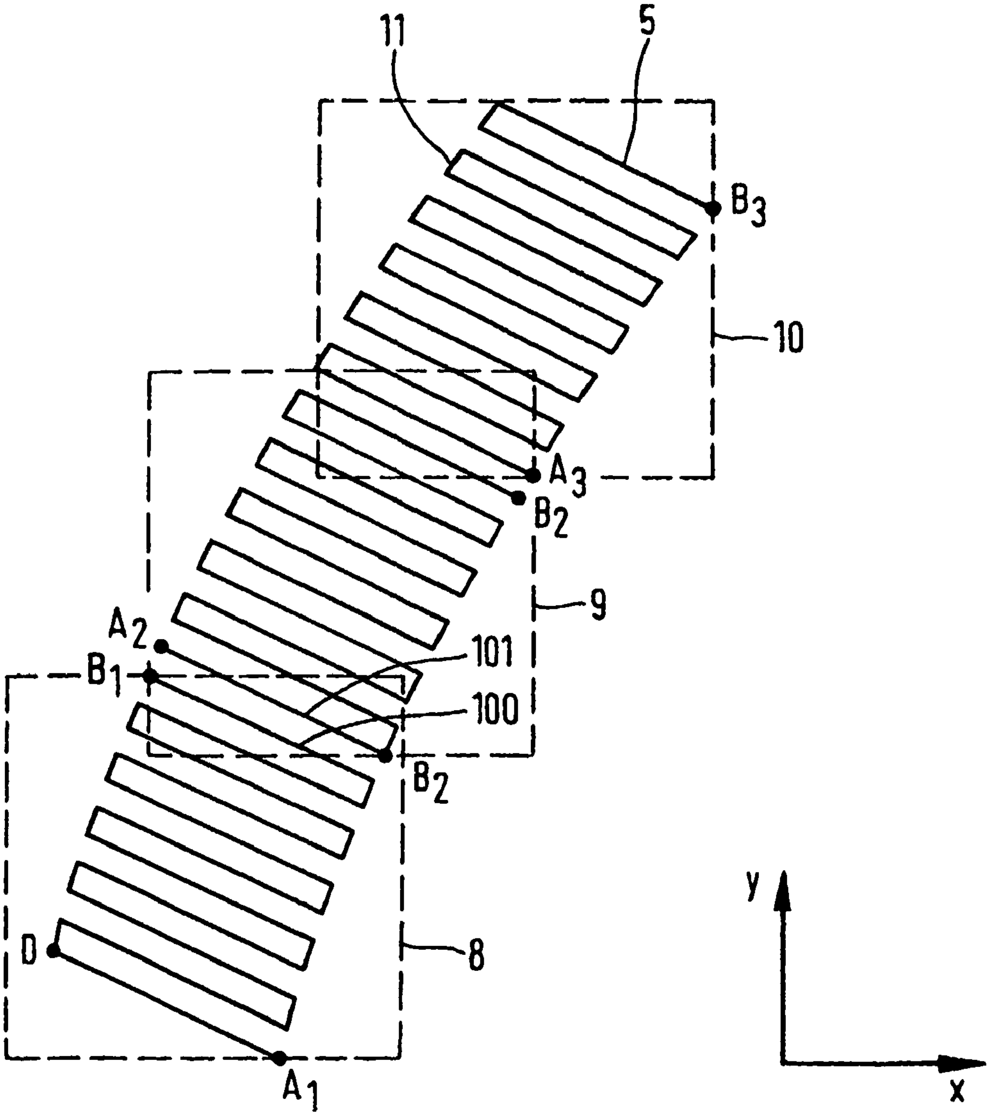

In FIG. 3*c* are shown, in addition to the polygonal curves $A_1B_1$, $A_2B_2$, $A_3B_3$, the working fields 8, 9, 10. When determining the position of the working field 8, for example, the y-coordinate of the coordinate window is set on the y-value of the starting point $A_1$, and the coordinate window is adjusted along the x-direction as long as the end point D of the first grating element completely lies within the defined coordinate window. Then the coordinates of the following grating elements are compared to the coordinates of the window and checked, whether they lie completely within the area of the coordinate window. At this stage the position of the coordinate window can still be optimized. From this comparison of the coordinates of the window and those of the grating elements finally results, that the grating element 100 is the last grating element, which completely fits into the coordinate window beginning at $A_1$. The working field 8 ends with the end point $B_1$ of the grating element 100.

For determining the working field 9 the coordinate window, due to the inclination of the grating field 4 in y-direction, is set on the end point $B_2$ of the following grating element 101 and again is adjusted as long as the maximum possible complete number of grating elements is lying within the coordinate window. This operation is carried out computer-aided and repeated as long as all grating elements are allocated to a working field. As appearing from FIG. 3*c* the working fields 8, 9, 10 can overlap each other.

The size of the working fields 8, 9, 10 here corresponds to the size of the electromagnetic deflection area of the electron beam. For exposing the substrate, at first the table is brought in such a position, that the working field 8 comes to lie under the electron beam. The electron beam is electromagnetically deflected and moved along the polygonal curve $A_1B_1$, and the respective grating lines 5 are written. As it will be explained in still more detail in another passage, here the short connecting sections 11 between the grating lines 5 within a polygonal curve $A_1B_1$, $A_2B_2$, $A_3B_3$ can be exposed too or not. Then the table is shifted in such a way, that the working field 9 comes to lie under the electron beam. The electron beam covers, by means of electromagnetic deflection, the polygonal curve $A_2B_2$ and exposes the respective grating lines 5 to the substrate. The working field 10 and the polygonal curve $A_3B_3$ are treated analogously. This operation is carried out as long as the entire grating field 4, in the present case the guilloche line 2, with the help of the electron beam is exposed to the substrate. The other grating fields of the grating image 1 are treated analogously.

Figure 4:
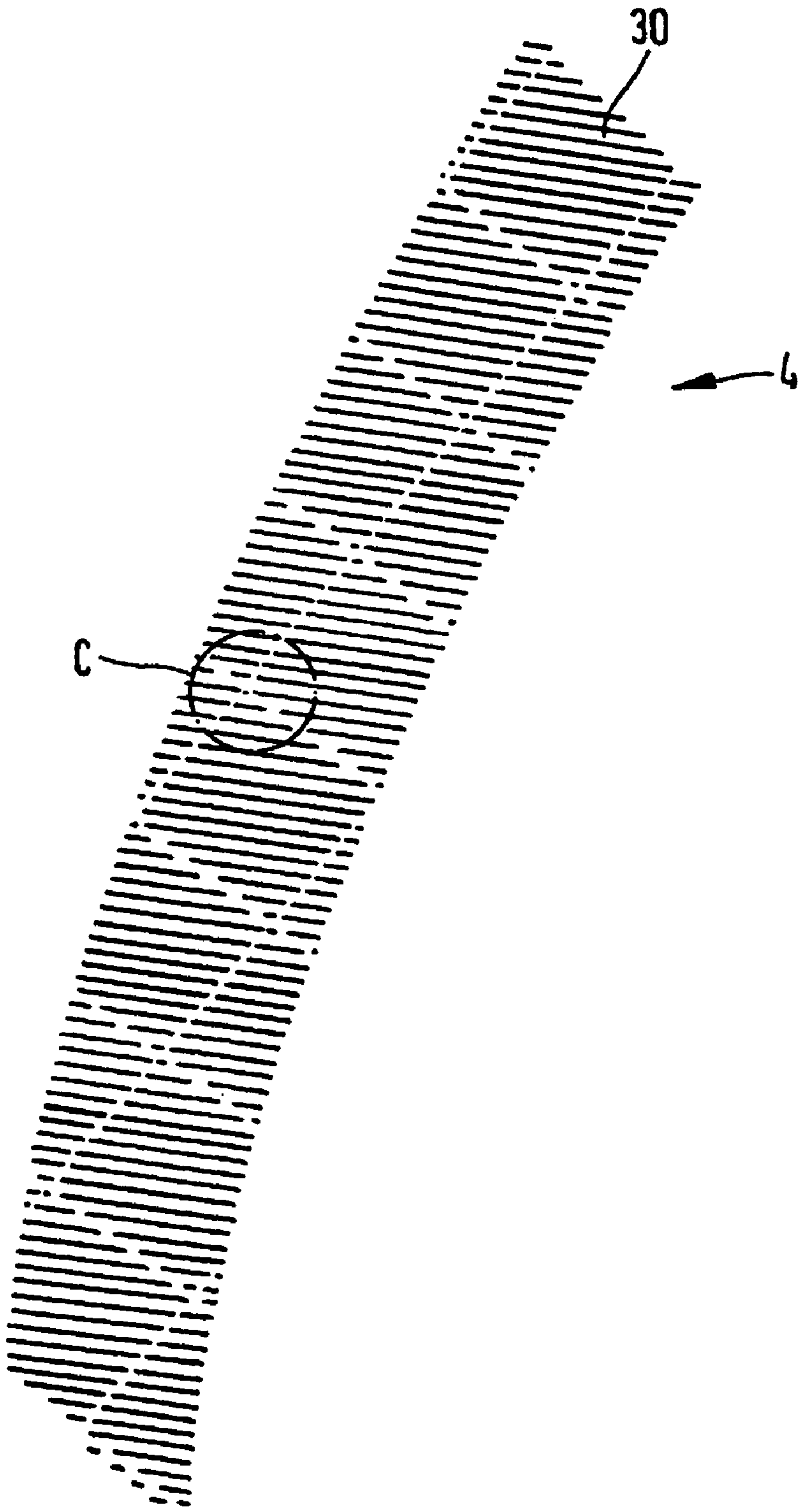
FIG. 4 shows a grating image produced according to prior art.

FIG. 4 shows the grating field 4, in the event it is produced according to the known stitching mode. The "screen elements" 30 independent of the depicted motif, in which are disposed partial sections of the grating lines, are clearly recognizable. Since the screen elements are not adapted to be put together exactly adjoining each other, the most grating lines extending across the width of the grating field have gaps and kinks, as recognizable in the marked area c.

Figure 5:
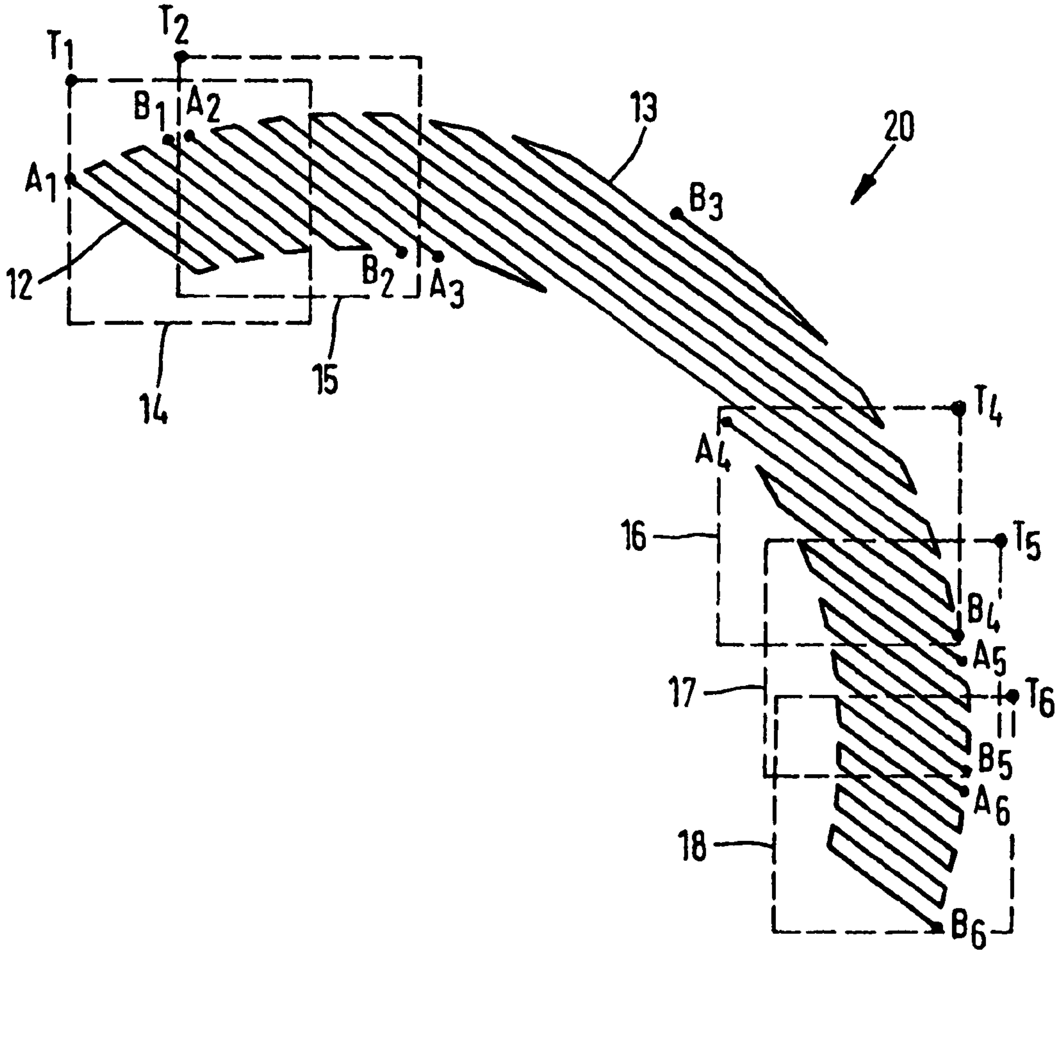
FIG. 5 shows the production of a grating field with long grating elements.

FIG. 5 shows a variant of the inventive method, in which a grating field 20 is to be written, which, too, has a linear outline contour. The grating lines forming the grating field 20 partly consist of grating lines 12, the coordinates of which are lying in the deflection area of the electron beam. Furthermore, the grating field 20 has large grating elements, the coordinates of which lie outside the deflection area of the electron beam. In the shown example these grating elements are also grating lines 13.

In this case, too, inventive working fields 14, 15, 16, 17, 18 are defined, in which are disposed the respective, according to the already described method, writable polygonal curves $A_1$,$B_1$, $A_2B_2$, $A_4B_4$, $A_5B_5$ and $A_6B_6$. The intermediate area, consisting of the polygonal curve $A_3B_3$, however, cannot be written according to the inventive method. Having exposed the working field 15 to the substrate according to the inventive method, for a short term another writing mode is used. In the shown example the polygonal curve $A_3B_3$, too, is written continuously merely by moving the table. I.e., the electron beam is not deflected and is mounted stationary, while the table and the substrate to be exposed located thereon are moved relative to the electron beam corresponding to the polygonal curve $A_3B_3$.

As already mentioned above, those polygonal curves lying in one working field can be exposed exactly in this form to the substrate. However, there are further possibilities for designing the writing paths within the respective working fields. The different possibilities for guiding the writing apparatus are described by way of example with the help of a polygonal curve, which is worked through within a working field.

Figure 6A:
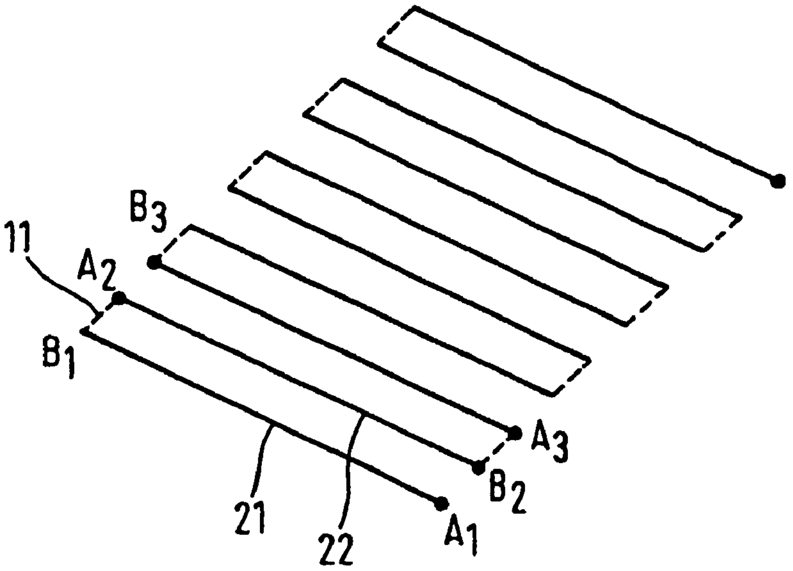
FIGS. 6*a*-6*d* show variants for writing paths within the working fields.

In FIG. 6*a* the variant is shown, in which merely the grating lines without the connecting sections 11 of the polygonal curve are to be exposed to the substrate. I.e., the electron beam having written the grating line 21 in the substrate, namely from the starting point $A_1$ to the end point $B_1$, has to cover an "idle way" to the starting point $A_2$ of the next grating line 22. The idle ways on the connecting sections 11 are drawn as dashed lines in FIG. 6*a*. On this idle way the electron beam can be turned off or in another fashion be prevented from exposing the substrate.

Since the short-term turn-off of the electron beam on the connecting sections 11 consumes time and disturbs the course of procedure, the connecting sections can also be exposed, so that in the substrate indeed a meandering polygonal curve with the starting point $A_1$ and the end point $B_1$ does exist. This small written edge sections due to their shortness do not spoil the optical impression of the entire grating image.

The connecting sections 11 do not have to be of a straight design, but can also be rounded, with the help of which the writing speed of the electron beam can be further increased. This embodiment is shown in FIG. 6*c*.

Figure 6B:
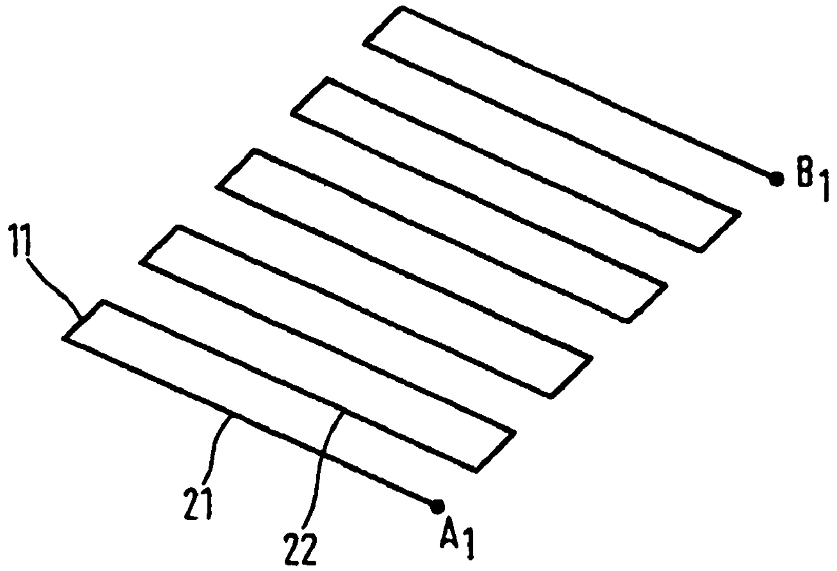
Figure 6C:
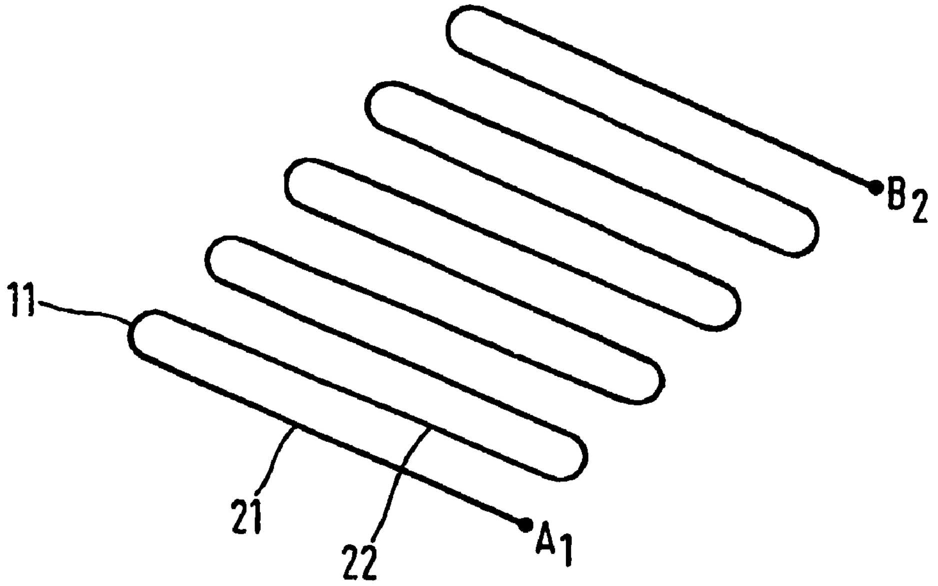
Figure 6D:
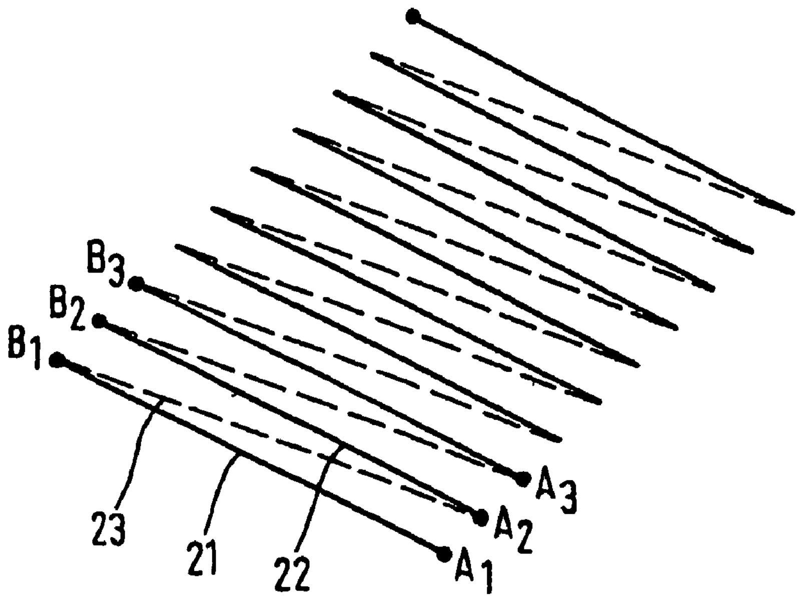

The meandering writing paths as shown in FIG. 6*a* to 6*c* are very useful, because they shorten the writing paths, but according to the invention they are not necessarily required. In FIG. 6*d* a different possibility is shown as to guide the writing apparatus, in particular the electron beam, between the individual exposure operations. Here the electron beam is guided starting from the starting point $A_1$ of the grating line 21 to the end point $B_1$ of the grating line 21 for exposing the grating line 21 to the substrate. Then the electron beam is diagonally guided back via the connecting section 23 to the starting point $A_2$ of the grating line 22. On this diagonal connecting distance 23 an exposure of the substrate does not take place. Then the grating line 22 from the starting point $A_2$ of the grating line 22 to the end point $B_2$ of the grating line 22 is exposed to the substrate. This operation is repeated in a kind of zigzag course until all grating lines of the working field are written. On the dashed drawn connecting line 23 the electron beam is either turned off or moved so fast, that an exposure does not take place.

Figure 7C:
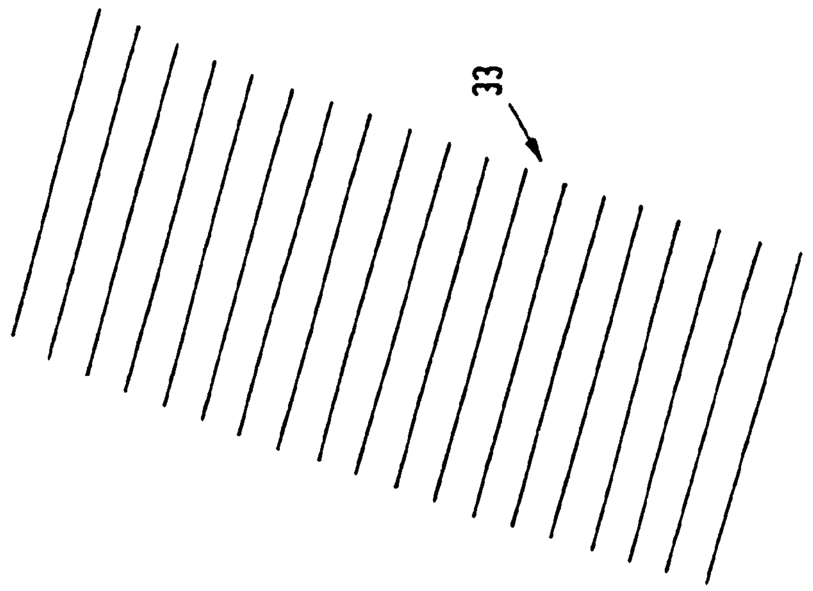
FIGS. 7*a*-7*c* show a variant of the inventive method.
Figure 7B:
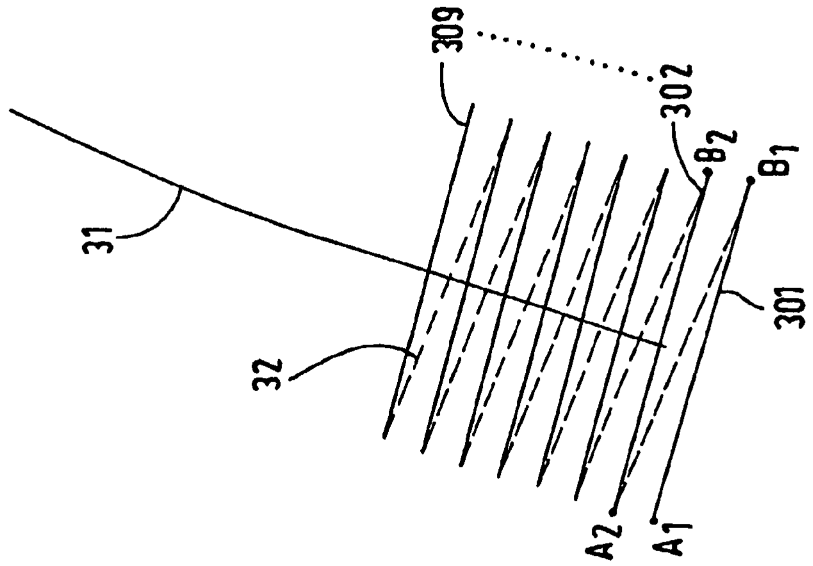
Figure 7A:
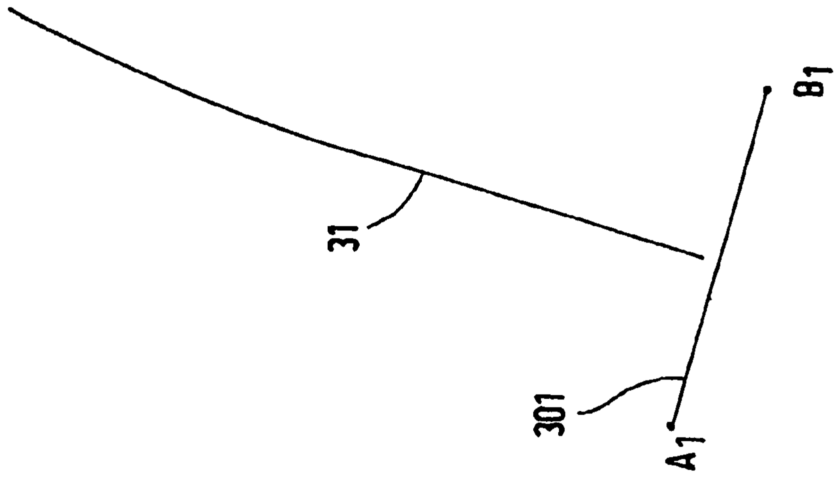

FIG. 7*a* to 7*c* show a special embodiment of the inventive method, in which in the working area, i.e. in the deflection area of an electron beam, only one line is written. In FIG. 7*a* a respective line 301 with the starting point $A_1$ and the end point $B_1$ is shown. Along this line 301 the electron beam moves within its deflection area. The carrier either moves step-by-step or continuously with an appropriate speed along the motion path 31. In FIG. 7*b* the overlapping of the carrier movement 31 with the movement of the electron beam is shown. In the shown detail of the process the electron beam has already written the grating lines 301 to 309, while being turned off on the retreat between the end point of the respective written line and the starting point of the next line. This is indicated by the dashed connecting lines 32. In FIG. 7*c*, finally, the completely written grating image 33 is shown, which consists of equally long grating lines, which are disposed along the motion path 31.

Figure 8A:
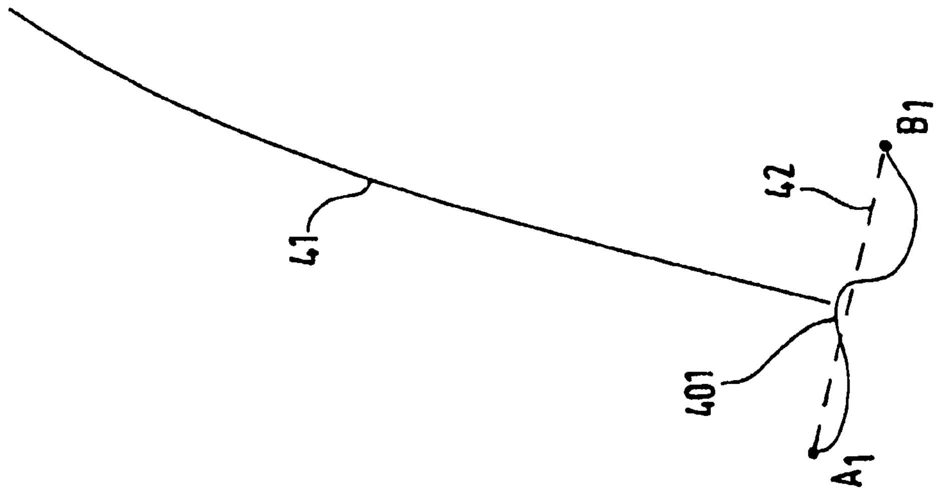
FIGS. 8*a*-8*c* show a further variant of the inventive method.
Figure 8B:
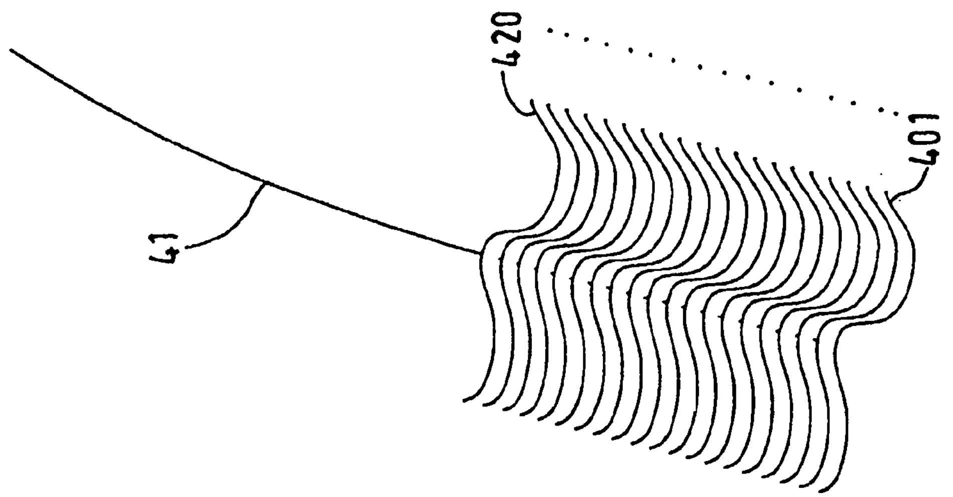
Figure 8C:
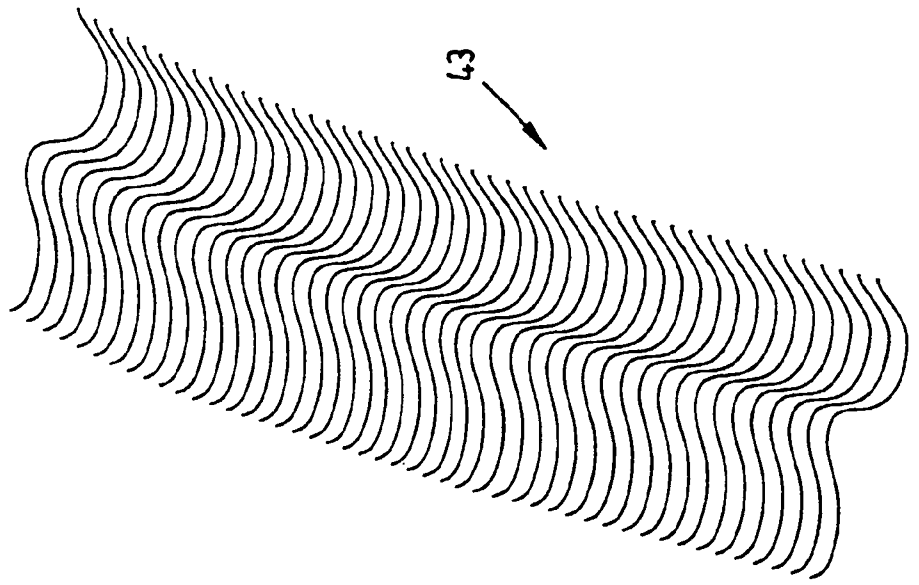

In FIG. 8*a* to 8*c* a similar variant of the inventive method is shown, in which the electron beam in its deflection area writes a complicated grating line 401 with the starting point $A_1$ and $B_1$. Here, too, the electron beam is turned off on the retreat 42. For clarity's sake the straight retreat 42 is not drawn into FIG. 8*b*. Here merely the grating lines 401 to 420 written along the motion path 41 are shown. The complete grating line image 43 is shown in FIG. 8*c*.

Figure 9:
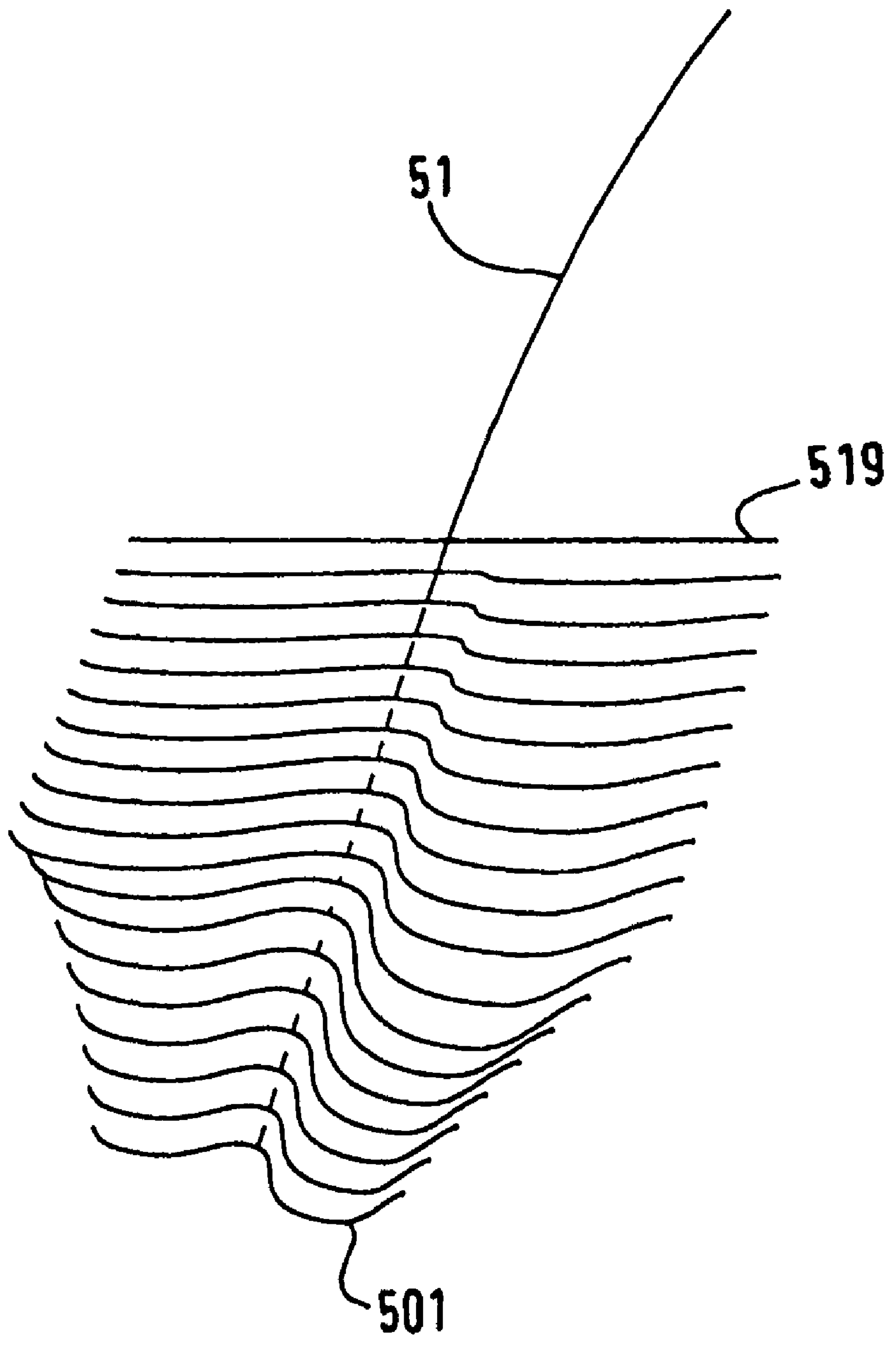
FIG. 9 shows a further variant of the inventive method.

If the electron beam motion after each writing operation or after each travelling back is separately programmed, also any other grating structures along a motion path of the carrier can be written. Such a variant is schematically shown in FIG. 9. In the shown example the form of the grating lines varies along the motion path 51. The grating line 501 is strongly curved. Along the motion path 51 the grating lines gradually become longer and their form more and more approaches the form of a straight line. The grating line 519 is practically straight and substantially longer than the grating line 501.

In the event the grating lines do not lie completely in the deflection area of the electron beam, they can either be divided into smaller pieces or a different writing mode (e.g. CPC) is applied.

The invention claimed is:

1. Method for producing a grating image, which at least has one grating field with visually recognizable, optically variable properties, in which grating lines are disposed, that are produced by means of a writing apparatus, wherein a working field of the writing apparatus has a fixed size predetermined by a deflection of a particle beam or of a light beam of the writing apparatus and the at least one grating field does not fit completely into the working field, and is to be moved to different positions of a substrate to be inscribed, the method comprising the following steps:

a) determining at least one uniform grating line, which completely lies within one working field;

b) defining a sequence of working fields with respect to the grating field, in each of which the at least one grating line is to be produced continuously without interruption along its entire length by means of deflection of the particle beam or of the light beam of the writing apparatus;

c) moving to the working fields by relative movement of a carrier, on which is located the substrate, and the writing apparatus;

d) writing the at least one grating line into the substrate by means of continuous deflection of the particle beam or of the light beam of the writing apparatus within the respective working fields.

2. Method according to claim 1, characterized in that the determination of the at least one grating element in step a) is effected with a help of a data record, which contains information about form and position of the at least one grating element forming the grating field.

3. Method according to claim 2, characterized in that the data record contains coordinates of starting points and end points of the at least one grating element.

4. Method according to claim 3, characterized in that the data record contains the coordinates of several intermediate points.

5. Method according to claim 2, characterized in that the data record contains coordinates of Bezier curves, which describe a form of the at least one grating element.

6. Method according to claim 2, characterized in that with a help of coordinates it is determined, which grating elements are to be continuously produced in one writing operation.

7. Method according to claim 1, characterized in that a coordinate window of the size of the working field is defined, and in step b) is put over the coordinates of the grating element.

8. Method according to claim 7, characterized in that starting out from a defined starting point it is determined, which grating elements succeeding each other completely lie in the area of this coordinate window.

9. Method according to claim 7, characterized in that the coordinates of the grating elements within a coordinate window are sorted in such a way, that polygonal curves are the result.

10. Method according to claim 7, characterized in that all working fields are determined with the help of the coordinate window.

11. Method according to claim 1, characterized in that as a writing apparatus a light beam or a particle beam is used.

12. Method according to claim 1, characterized in that as a writing apparatus an electron beam is used.

13. Method according to claim 1, characterized in that the writing in of the grating elements in step d) is effected by deflection, of the writing apparatus.

14. The method of claim 13 wherein said deflection is by electromagnetic deflection.

15. Method according to claim 1, characterized in that the size of the working fields corresponds to the size of the deflection area of the writing apparatus.

16. Method according to claim 1, characterized in that when writing in the grating elements in step d) the writing apparatus is mounted stationary and the carrier is moved.

17. Method according to claim 1, characterized in that as a carrier a movably mounted table is used.

18. Method according to claim 1, characterized in that the working fields in step c) are moved to by moving the carrier.

19. Method according to claim 1, characterized in that the grating field has the form of a line.

20. Method according to claim 1, characterized in that as grating elements grating lines are used.

21. Method according to claim 1, characterized in that the grating lines at least in certain areas extend across the width of the grating field.

22. Method according to claim 1, characterized in that the grating lines are formed straight or curved.

23. Method according to claim 1, characterized in that in at least one working field only one grating element is produced.

24. Method according to claim 23, characterized in that in each working field only one grating element is produced and the individual positions of the grating elements along a motion path are moved to by a stepwise or continuous movement of the carrier.

25. Method according to claim 1, characterized in that all grating elements have the same form.

26. Method according to claim 1, characterized in that the grating elements have different forms.

27. Method according to claim 1, characterized in that the grating image has large grating elements, the coordinates of which at least partly lie outside the working field, and that these grating elements are produced according to a different method.

28. Method according to claim 27, characterized in that these large grating elements are produced continuously by shifting the carrier.

29. Method according to claim 27, characterized in that these large grating elements are divided into processing areas, the size of which corresponds to maximally one working field.

30. Method according to claim 29, characterized in that the processing areas are moved to successively by shifting the carrier and the parts of the large grating elements lying in the respective processing area are produced.

31. Method according to claim 1, characterized in that when defining the sequence of the working fields also the processing areas are taken into account.

32. Method according to claim 1, characterized in that the large grating elements are long grating lines, the coordinates of which lie outside the deflection area of the writing apparatus.

33. Method according to claim 1, characterized in that the writing paths of the writing apparatus within the respective working fields or processing areas have a meandering or zigzag shape.

34. Method according to claim 1, characterized in that in a data processing system at first all coordinates necessary for the production of the grating elements are determined, and then the writing apparatus with the help of these coordinates produces the grating elements in the substrate.

35. Method according to claim 1, characterized in that as a substrate a radiation-sensitive material is used, in which the writing apparatus causes a change of state.

36. Method according to claim 35, characterized in that as a radiation-sensitive material a photoresist layer is used.

37. Method according to claim 1, characterized in that onto the substrate provided with the grating elements a metallization is applied, and a metallic molding is galvanically produced therefrom.

38. Method according to claim 37, characterized in that the molding is used as an embossing tool for embossing a grating image into a layer.

39. Method according to claim 1, characterized in that the grating image has several grating fields.

40. Apparatus for carrying out the method according to claim 1.

41. Grating image produced according to claim 1.

42. Security element with at least one grating image produced according to claim 1.

43. Security element according to claim 42, characterized in that the security element is a security thread, a label or a transfer element.

44. Security paper with the security element according to claim 42.

45. Security document with the security element according to claim 42.

46. Security paper with at least one grating image produced according to claim 1.

47. Security document with the security paper according to claim 46.

48. Security document with at least one grating image produced according to claim 1.

49. Transfer material, with at least one grating image, produced according to claim 1.

50. The transfer material of claim 49, comprising hot stamping foil.

51. Embossing tool with at least one grating image, produced according to claim 1.

* * * * *